United States Patent [19]

Saito

[11] Patent Number: 5,477,117
[45] Date of Patent: Dec. 19, 1995

[54] MOTION CONTROLLER AND SYNCHRONOUS CONTROL PROCESS THEREFOR

[75] Inventor: Kimio Saito, Aichi, Japan

[73] Assignee: Mitsubishi Denki Kabushiki Kaisha, Tokyo, Japan

[21] Appl. No.: 290,118

[22] Filed: Aug. 15, 1994

Related U.S. Application Data

[62] Division of Ser. No. 723,116, Jun. 28, 1991.

[30] Foreign Application Priority Data

Jun. 29, 1990 [JP] Japan .................................. 2-171780

[51] Int. Cl.⁶ .................................................. G05B 11/01
[52] U.S. Cl. .................. 318/568.22; 318/628; 318/687; 226/2; 198/460.1
[58] Field of Search .................................. 318/560–696; 198/832.1, 321, 341, 810, 794, 523, 805, 855, 460, 577, 572, 461, 575, 579; 53/77, 461, 58, 493, 51, 450, 55; 414/273; 83/26, 73, 79, 83; 271/157, 158, 159, 193, 194, 901; 382/1, 8; 118/697; 226/108, 95

[56] References Cited

U.S. PATENT DOCUMENTS

| | | | |
|---|---|---|---|
| 4,086,522 | 4/1978 | Engelberger et al. | 318/568 |
| 4,473,883 | 9/1984 | Yoshida et al. | 364/474 |
| 4,669,168 | 6/1987 | Tamura et al. | 29/429 |
| 4,704,568 | 11/1987 | Beck et al. | 318/687 |
| 4,731,567 | 3/1988 | Dands et al. | 318/594 |
| 4,766,546 | 8/1988 | Fujimoto | 364/474 |
| 4,795,956 | 1/1989 | Beck | 318/628 |
| 4,824,001 | 4/1989 | Mick, Jr. et al. | 156/64 |
| 4,941,182 | 7/1990 | Patel | 382/1 |
| 5,025,200 | 6/1991 | Kurakake et al. | 318/569 |
| 5,070,995 | 12/1991 | Schaffer et al. | 198/460 |
| 5,087,805 | 2/1992 | Silverschotz et al. | 219/121.71 |
| 5,129,568 | 7/1992 | Fokos et al. | 226/27 |
| 5,197,262 | 3/1993 | Katz et al. | 53/550 |
| 5,224,640 | 7/1993 | Fokos et al. | 226/27 |
| 5,361,960 | 11/1994 | Fokos et al. | 226/2 |

FOREIGN PATENT DOCUMENTS 64-67605  3/1989  Japan .

*Primary Examiner*—Paul Ip
*Attorney, Agent, or Firm*—Sughrue, Mion, Zinn, Macpeak & Seas; Laura C. Brutman; Richard C. Turner

[57] ABSTRACT

In a system including a machine tool which operates on conveyed workpieces, a motion controller for the NC-controlled machine tool is improved by performing compensation for conveyor movement outside of the operation processor, so that compensation may be performed without modification of a machining program which does not take conveyor movement into consideration.

3 Claims, 8 Drawing Sheets

G90 G94 G01 X-100. F1000.;

AUTOMATIC SHIFT OF
PROGRAM COORDINATES

G90 G94 G01 Y100. F1000.;

AUTOMATIC SHIFT OF
PROGRAM COORDINATES

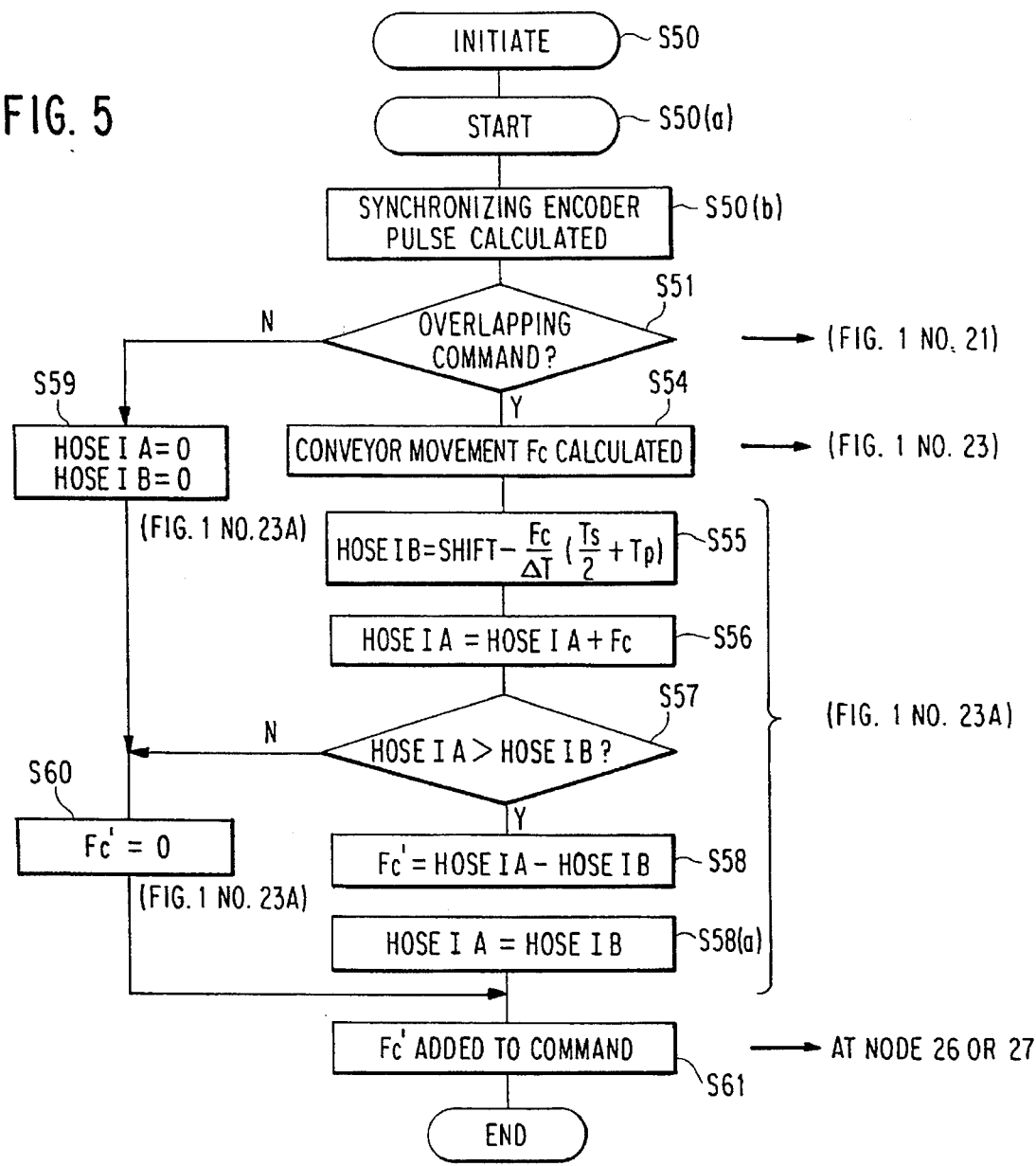

5,477,117

MOTION CONTROLLER AND SYNCHRONOUS CONTROL PROCESS THEREFOR

This is a divisional of application Ser. No. 07/723,116 filed Jun. 28, 1991 pending.

BACKGROUND OF INVENTION

1. Field of the Invention

The present invention relates to a motion controller for controlling the machining of a workpiece traveling on a conveyor, in synchronization with the motion of the conveyor, and a synchronous control process for that motion controller.

2. Description of the Background Art

A machining system which forms the environment for the present invention is seen in FIG. 3 which is not prior art to the invention, where a conveyor 31 carries a workpiece 30 along a path in a direction D. The movement of the conveyor is detected by an encoder 3, which generates pulses in response to the rotation of a conveyor roller or the movement of the conveyor itself past an internal sensor. A workpiece machining position is at a predetermined location along the path of conveyor movement and there is located before that position a sensor 32 for detecting the presence of the workpiece. A machine tool (not shown) is moved in horizontal and vertical directions by guides 33 and 34, respectively, each operating under control of a servo motor 15. A typical servo-controlled structure using a ball screw for controlling machine tool movement is seen in FIG. 10. The servomotor operates in a servo system that includes the motor 15, a position detector 16, servo amplifiers 14 and a motion control unit 1.

FIG. 7 is a block diagram illustrating a conventional motion controller. Referring to FIG. 7, the motion controller 1 includes an operation processor 2 for generating speed command data for a machine having a tool that is movable to machine the workpiece. A synchronizing encoder is installed on a conveyor or similar transport mechanism and provides feedback pulses to an encoder interface 4, which counts the feedback pulses from the synchronizing encoder 3. A differential processor 5 computes the number of pulses per unit time, based on an input from the encoder interface 4, and provides that quantity to the operation processor 2. External machine switches 6 are connected to an input interface 7 which provides corresponding signals to the operation processor 2. External lamps and indicators (e.g., a counter) 8, receive signals from the operation processor 2 via an output interface 9. A CRT operation panel 10 is operative to interactively enter and modify automatic programs in a program file 11. Speed command data for each of the horizontal and vertical directions is output by the operation processor 2 in square pulse form and is converted into a smooth speed waveform by an acceleration/deceleration processor 12, in order to reduce the mechanical shock which would be caused by attempted instantaneous compliance with the command pulse. The speed command data output by the acceleration/deceleration processor 12 is accumulated by a summing device 13 and comprises position command data. The position command data is input to a summing node 17 of a feedback servo control loop, the node 17 providing a position deviation value to a servo amplifier 14. The servo amplifier output energizes a motor 15 for driving the machine tool in a desired direction for machining the workpiece. A detector 16 generates pulses in accordance with the rotation of the motor 15 and provides the pulses to the summing node 17 of the servo loop. Similar arrangements are provided for controlling both the horizontal and vertical movement of the machine.

FIG. 8(a) provides a programming example for synchronous control using conventional NC language, wherein G90 indicates use of absolute coordinate values in program coordinates, G95 instructs a synchronous feed mode, G01 defines linear interpolation, X and Y define orthogonal directions and are followed by coordinate values of an end point, and F defines a feedrate per revolution of the synchronizing encoder 3, e.g., "F10" specifies a feed of 10 mm per revolution. All of these program inputs must be specified by an operator.

Operation will now be described. When an automatic run mode select signal is entered by the corresponding machine switch 6 and an automatic run_start signal is then entered, the operation processor 2 reads a program from the program file 11 and initiates an automatic run. The command data provided at this time by the operation processor 2 is created in proportion to pulses fed back by the encoder 3. Hence, if the conveyor is stopped and there is no feedback pulse from the encoder 3, no command data is output by processor 2 and the motors 15 are also stopped. When the conveyor moves, feedback pulses are generated by the encoder 3 and the command data is generated by processor 2.

The command data must be written in consideration of the movement of the conveyor in order to accurately move the machine tool to a target end point value on the conveyor, as shown in the programming example in FIG. 8(a). For instance, assume that the encoder 3 rotates one turn while the conveyor moves 10 mm and the end point is reached when the conveyor moves 100 mm (the synchronizing encoder 3 rotates 10 turns). In FIGS. 8(a) and 8(b) the Solid line arrows indicate the movement of the machine tool which would be required were the workpiece stationary, i.e., not conveyor mounted. The dotted line arrow indicates the actual tool path necessary to compensate for conveyor movement. In FIG. 8(a), the end point (X, Y) is nominally (−100, 0), however the end point changes to (−200, 0) when the movement of the conveyor is considered. The feedrate also changes from F10 to F20 when the movement of the conveyor is considered. The operator must therefore take account of the conveyor speed and accordingly change the machining program.

In FIG. 8(b), where the end point (X, Y) is nominally (0,100), it changes to (−100, 100) when the movement of the conveyor is considered. The feedrate per revolution of the encoder 3 at this time also changes from nominal F10 to F14.142 (=10×√2 when the movement of the conveyor is considered.

As described above, the speed command data for each axis (X, Y) output by the operation processor 2 is converted into a smooth command speed waveform through the acceleration/deceleration processor 12 and is accumulated at summing device 13 in order to create the position command data. The position command data is output to summing node 17 as the command data for a servo processor. The servo processor causes a position loop to be formed using the position deviation value, servo amplifier 14, motor 15 and detector 16 so that the machine tool is moved to the commanded position.

FIGS. 9(a) and 9(b) illustrate the variation of conveyor speed (vertical axis) with time (horizontal axis) beginning with a synchronization start signal. The solid line in each Figure represents actual movement of the machine tool in the X direction, FIG. 9(b) having a higher conveyor speed than FIG. 9(a). For a given conveyor speed, upon occurrence of the synchronization signal, an acceleration/deceleration delay time constant of device 12 will "soften" the speed command and cause a slight delay in the beginning of Command execution. The theoretical command line (i.e., the theoretical machine tool speed, taking the delay time constant into consideration) is seen in FIGS. 9(a) and 9(b) as a dotted line, and is referred to as the theoretical delay curve. However, due to inertia, processing time and the like, there will actually be some further delay between the issuance of the synchronization pulse, and time when the machine tool gets up to speed. The actual delay is seen as the solid line in the Figures and illustrates how the actual machine tool speed changes with time, beginning with the occurrence of the synchronization pulse, to eventually achieve a steady state at the desired speed. A period of time will pass between the theoretical delay (dotted line) and the actual movement of the machine tool (solid line). The product of the time (sec) and the speed (mm/sec), i.e., the hatched area in the Figures, corresponds to the distance that the conveyor will move the work before the machine responds to the command. If this delay value is a constant, synchronization between the conveyor/workpiece and machine tool is readily achieved. However, as is evident from comparing FIGS. 9(a) and 9(b), the delay value changes with different conveyor speeds. Thus, in the conventional art, the operator must conduct time runs to determine what delay value should be used. As shown in FIGS. 9(a) and 9(b), the delay value may be represented by the following expression and will depend on the conveyor speed:

$$D = \frac{Fc}{60} \left( \frac{Ts}{2} + Tp \right) \quad (1)$$

where,

D=delay value (mm)

Fc=conveyor speed (mm/min.)

Ts=acceleration/deceleration time constant (sec)

Tp=position loop time constant (sec)

In the prior art, it was not possible to account for the delay time other than through experimental test runs, thereby making operation difficult and time consuming.

Another example of this type of controller is disclosed in Japanese Patent Disclosure No. 45887 of 1983. This system can establish speed synchronization but similarly has the disadvantage in that the relative position of the tool and workpiece varies when the conveyor speed-changes in real time. A process for controlling a robot in synchronization with a conveyor is disclosed in Japanese Patent Disclosure No. 67605 of 1989. That process operates on a target value by detection of the movement of the conveyor by interpolation. However, the interpolation period must be short in order to enhance the accuracy of synchronization.

The conventional motion controller and the synchronous control process therefor as described above requires a machining program that operates on machining information, e.g., the moving speed, for machining a workpiece on a conveyor, created in consideration of the moving speed of the conveyor. The variation of the motion delay value of the machining device with respect to the moving speed of the conveyor makes it difficult to synchronize the position of the conveyor with that of the machining device if the moving speed of the conveyor varies.

SUMMARY OF THE INVENTION

It is accordingly an object of the present invention to overcome the disadvantages in the prior art by providing a motion controller and a synchronous control process therefor which allow a machining program for machining a workpiece on a conveyor to be written without requiring consideration of the moving speed of the conveyor.

A motion controller according to a first embodiment of the present invention comprises: machining information operating means for running a machining program for machining a workpiece on a conveyor via machining means in accordance with an external command, operating on machining information on the workpiece, and outputting an operation result; conveyor movement information means for operating on movement information of the conveyor in accordance with a signal entered by an encoder for detecting the movement of the conveyor, and outputting an operation result; and information combining means for combining conveyor movement information output by the conveyor movement information operating means with the workpiece machining information provided by the machining information operating means for machining the workpiece on the conveyor in synchronization with the motion of the conveyor.

In accordance with the first embodiment, the machining information operating means runs the machining program for machining the workpiece on the conveyor via the machining means in accordance with an external command and operates on the machining information for the workpiece, and outputs the operation result, the conveyor movement information operating means operates on the movement information on the conveyor in accordance with the signal entered by the encoder for detecting the movement of the conveyor, and outputs the operation result, and the information combining means combines the conveyor movement information output by the conveyor movement information operating means with the workpiece machining information provided by the machining information operating means for machining the workpiece on the conveyor in synchronization with the motion of the conveyor.

In a motion controller according to a second embodiment of the present invention, the conveyor movement information operating means comprises position compensating means for maintaining a predetermined positional relationship of the machining means to the workpiece on the conveyor, independently of the magnitude of the conveyor moving speed.

In accordance with the second embodiment, the position compensating means provided for the conveyor movement information means maintains a predetermined positional relationship of the machining means to the workpiece on the conveyor, independently of the magnitude of conveyor moving speed.

A synchronous control process for a motion controller of the present invention comprises the steps of operating on movement information using conveyor movement information from a signal entered by an encoder for detecting the movement of the conveyor and outputting an operation result; running a machining program for the machining of the workpiece using machining information means in accordance with an external command, operating on the machining information of the workpiece, and outputting an operation result; and combining conveyor movement information output by conveyor movement information means with the workpiece machining information provided by the machining information means by using information over lapping means; and machining the workpiece on the conveyor in synchronization with the motion of the conveyor.

In accordance with the method, the movement information of the conveyor is operated on and output by the conveyor movement information operating means in accordance with the signal on conveyor movement entered by the encoder, the machining program for the machining means is run by the machining information means in accordance with the external command entered, the machining information on the workpiece is operated on and output, and the conveyor movement information is overlapped with the workpiece machining information by the information overlapping means to machine the workpiece on the conveyor in synchronization with the motion of the conveyor.

BRIEF DESCRIPTION OF THE DRAWINGS

FIG. 4 gives a program example for the execution of synchronous control in the system shown in FIG. 3.

FIG. 5 is a compensation processing flowchart for the synchronous control of position.

DESCRIPTION OF THE PREFERRED EMBODIMENT

Figure 1:
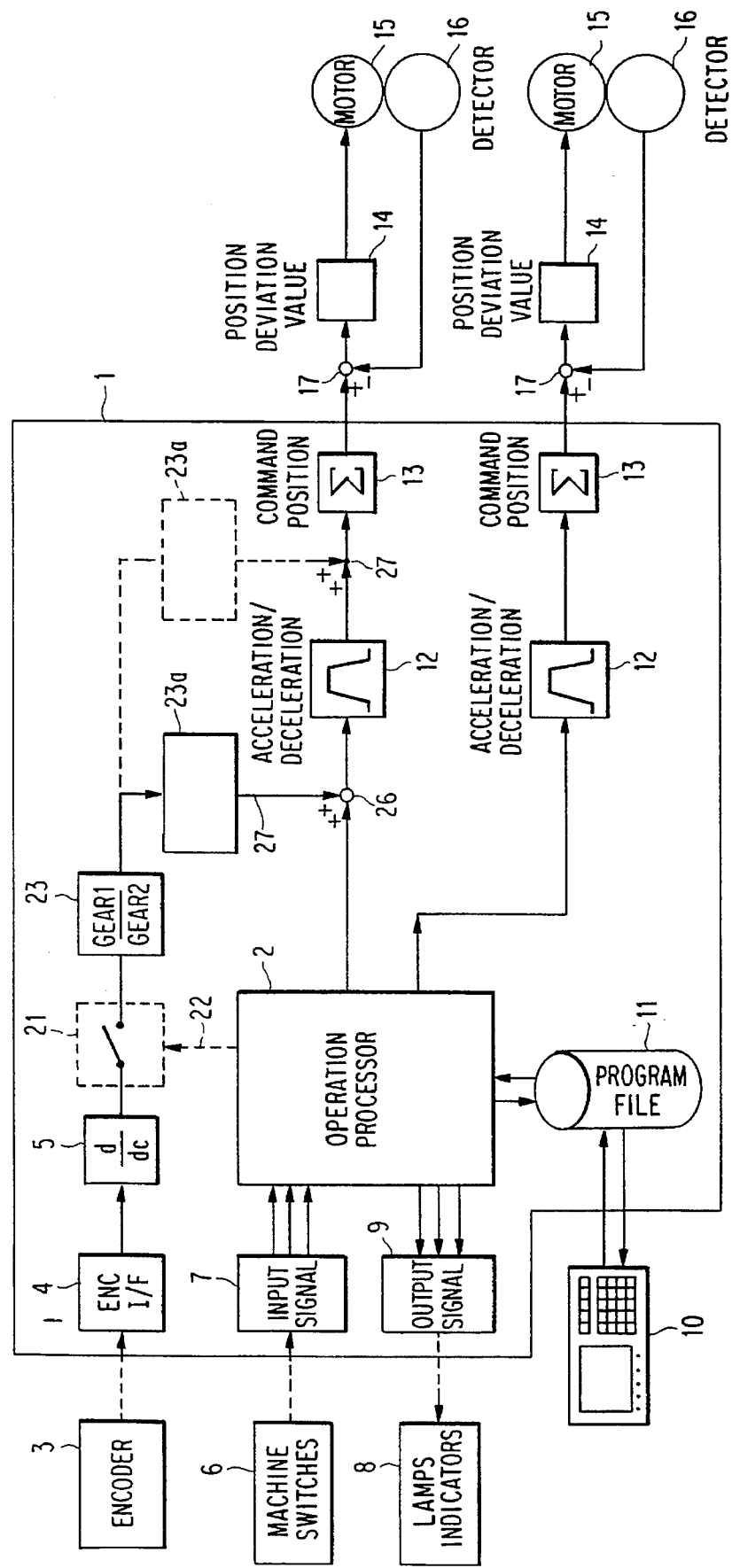
FIG. 1 is a block diagram showing the configuration of a motion controller according to one embodiment of the present invention.

One embodiment of the present invention will now be described with reference to FIGS. 1 to 6, wherein like reference characters designate like or corresponding parts throughout the several views. The conveyor system employing the motion controller of the present invention was described above in connection with FIG. 3, and will be described further here only as necessary for an understanding of the invention.

FIG. 1 is a block diagram showing the configuration of the motion controller 1A. Referring to FIG. 1, it should be noted that the operation processor 2 does not receive any information concerning conveyor movement. The controller 1A includes a switching processor 21 that is selectively operable to cause the performance of either a normal state run in which the machine tool alone is controlled without consideration of conveyor movement, i.e., when the conveyor is stopped at a machining position (OFF), or the performance of a combined (machining/conveyor) run (ON). A combined run control signal 22 is output by the operation processor 2 and controls the state selected by the switching processor 21. A unit conversion processor 23 receives the output of switching processor 21 and causes the conveyor velocity information from differential processor 5 to be converted into a unit system identical to that of a speed command. This unit conversion is accomplished by an "electronic gearing" during a combined machining/conveyor run. A position compensating delay circuit 23A is operative to set the delay between the detection of the workpiece and the beginning of movement of the machine tool. This circuit will output a value of 0 until the delay period has expired, at which point a speed command speed signal 24 is output by delay circuit 23A and is added to the speed command pulse of the operation processor 2 at summing node 26. The delay value is dependent on the detected conveyor speed. The output of node 26 is a combined speed command pulse that is softened by acceleration/deceleration device 12. The combined output is referred to herein as an "overlapping" signal or command that comprises a combination of regular machine command information and a correction for conveyor speed. The operation of circuit 23A in determining the delay value is presented in greater detail in FIG. 5 hereafter.

Alternatively, the output of position compensating 23A may be input to a second summing junction 27, as a second speed command signal 25. Signal 25 is identical to the speed command signal 24, but in this case, is provided after the output of the acceleration/deceleration processor 12. This improves the system's response to the conveyor as compared to addition made at summing node 26 in front of the acceleration/deceleration processor 12. However, care must be taken because the mechanical system may be given a shock by a sudden change in speed command for the mechanical system, when the command from the operation processor 2 and the speed command signal from circuit 23A are combined at node 27.

A conventional adder may serve as the combining circuit at node 26 or 27. The machining information means comprises the operation processor 2, and the movement information means comprises the differential processor 5, switching processor 21, unit conversion processor 23 and position compensating unit 23A.

Figure 2A:
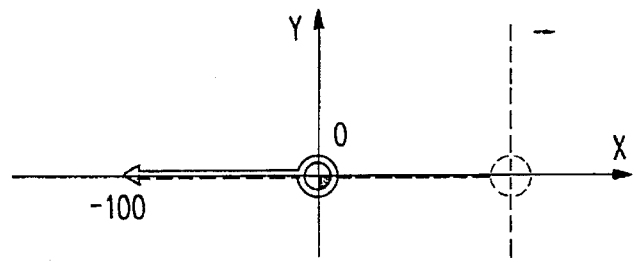
FIGS. 2(a) and 2(b) provide a program example for synchronous control according to the present invention.
Figure 2B:
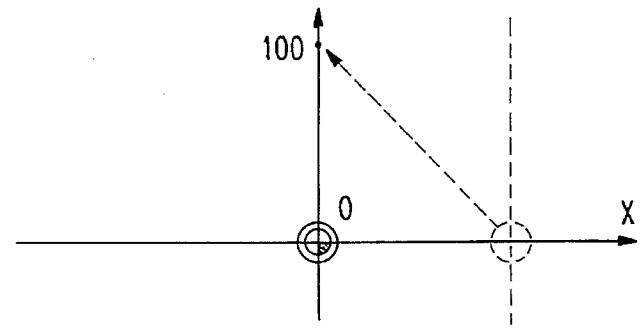

FIGS. 2(a) and 2(b) show a programming example for this embodiment, wherein G90 defines absolute coordinate values as program coordinates, G94 specifies a feed mode per minute, G01 specifies linear interpolation, X and Y followed by coordinate values define the coordinates of an end point, and F defines a machine feedrate per minute, e.g., F1000 specifies a feed of 1000 mm per minute. The effective feedrate of the machine in the combined mode is the addition of the conveyor feedrate to F1000. As subsequently explained in greater detail, FIG. 2(a) illustrates the input of X coordinates, and the automatic shift of program coordinates and FIG. 2(b) illustrates the input of Y coordinates and the automatic shift. The important point is that the program is here written without regard to the conveyor movement. That is, the programmer need not consider a moving frame of reference when preparing a program, thus greatly simplifying the programming process. The conveyor speed is now taken into account by circuit elements 21–27 (FIG. 1) automatically. Allowing the programming to be free of speed conversion factors to accommodate conveyor speed also allows programs previously written for a stationary workpiece system to be employed in a moving workpiece environment.

Referring again to FIG. 3, an embodiment of a machining system that may be operated under synchronous control in accordance with the present invention is illustrated. A conveyor 31 is moved in the direction of the arrow and carries a workpiece to a position past a sensor 32, which is operative to output a start signal. One driven axis 33 defines movement of the machining tool in a direction coincident with the feed of the conveyor 31 and performs position control in a horizontal direction. A second axis 34 defines movement of the machining tool and position control in a vertical direction.

Figure 3:
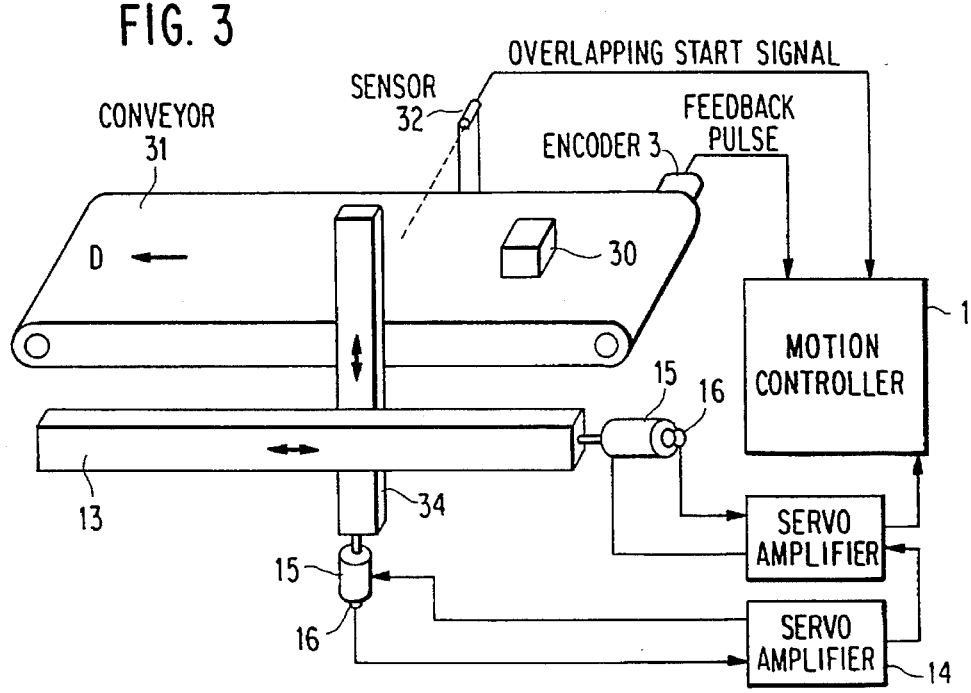
FIG. 3 is a synchronous control system configuration diagram.

FIG. 4 gives a sample program for synchronous control of a repetitive machining process in the system configuration shown in FIG. 3. G53 identifies a command to move the machine tool to a position specified with respect to parameters (X,Y) in a machine coordinate system (intrinsic to the machine) here a position (X,Y)=(O,O); G0 identifies a command for a rapid traverse; G92 is a command for presetting (initializing) the program coordinate system; and M10 is an auxiliary command in the NC language which will delay movement of the machine until the entry of an external signal, e.g., from the sensor 32 in this example. The program area from M10 to M11 performs an automatic machining run that is coordinated with the feed of the conveyor. During this period, the program coordinate system is automatically shifted in accordance with the feed of the conveyor. M11 is an auxiliary command like M10 and is used as a command to end the combined run. M99 indicates a return to the beginning of the program and re-execution of the same program.

Figure 6A:
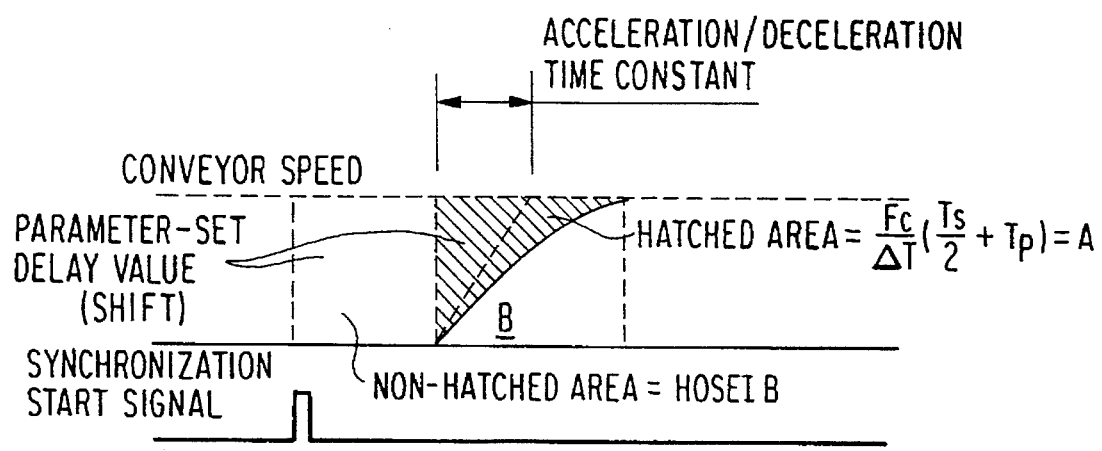
FIGS. 6(a), 6(b) and 6(c) illustrate a relationship between a conveyor speed and a machine delay value during the execution of the processing shown in FIG. 5.
Figure 6B:
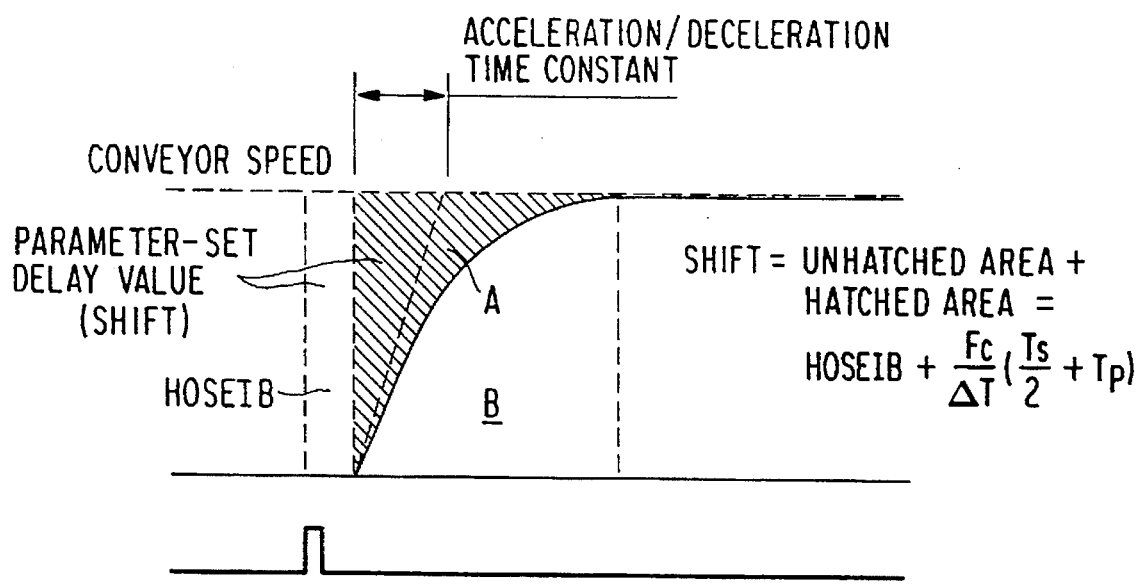

FIG. 5 is a flowchart illustrating the method of calculating the overlapping movement per unit time with respect to the detected conveyor speed. FIGS. 6(a) and 6(b) show delay values with respect to the motion of the conveyor when the processing in FIG. 5 is performed. As shown in FIGS. 6(a) and 6(b), the combining operation is conducted in order to maintain a constant delay value as an operating parameter, even if the conveyor speed changes. The hatched area indicates a delay value resulting from the acceleration/deceleration processor 12 during a command smoothing operation (linear acceleration/deceleration) and the position loop processing, etc. The delay value is proportional to the conveyor speed.

Operation of the system will now be described with respect to FIGS. 1, 3, 4, 5 and 6(a) and 6(b). When an automatic run mode select signal is entered by the corresponding machine switch 6 and an automatic run start signal subsequently is entered, the operation processor 2 reads a machining program from the program file 11, created beforehand through the CRT operation panel 10, and initiates an automatic run.

Referring now to the program in FIG. 4, when M10 is executed, the machine waits for a combined run start signal (from the sensor 32). When the combined run start signal is entered, the operation processor 2 outputs the combined run control signal 22, which then switches ON the switching processor 21 to initiate a combined run operation. On start of the combined run operation, compensation is made to maintain the parameter-set delay value constant. The process for this purpose is shown in the flowchart of FIG. 5. In accordance with the program shown in FIG. 4,' When M11 is executed, the operation processor 2 outputs a combined run end signal, which then switches OFF the switching processor 21 to terminate the combined run operation.

The feedback pulses from the encoder 3 during the combined run are differentiated and then converted by the unit conversion processor 23 into units that are identical to that of the speed command. The delivery of the converted conveyor speed signals is then delayed in unit 23A, and the signals are combined at summing junction 26 prior to the acceleration/deceleration processor 12 after a delay period that depends on the detected conveyor speed.

The overlapped movement per unit time may be calculated in accordance with the flowchart illustrated in FIG. 5. The calculation is a function of the current offset value (HOSEIA) and the theoretical offset value (HOSEIB) for the distance traveled between the time that a workpiece is detected by sensor 32 and the time that the machine, located at a downstream position, starts its operation. The theoretical offset is calculated as follows:

$$HOSEIB = SHIFT - \frac{Fc}{\Delta T} \left( \frac{Ts}{2} + Tp \right) \quad (2)$$

where
HOSEIB=theoretical offset value (mm)
SHIFT=parameter-set delay value with respect to the conveyor (constant).
Fc=conveyor movement per unit time (mm/ΔT)
ΔT=sampling period
Ts=linear acceleration/deceleration time constant (sec)
Tp=position loop time constant (sec)

By way of further explanation, the value "SHIFT" is a parameter value set in advance within the system and is maintained equal to a constant. SHIFT corresponds to the sum of the hatched area and the white area (bounded by dotted lines) in FIGS. 6(a) and 6(b). HOSEIB corresponds to the white area, while the area of the hatched region in FIGS. 6(a) and 6(b) can be calculated from the right-hand term in equation (2) above. This term, referred to as "A", is dependent on the conveyor speed Fc and is thus not a constant. The term increases with increasing conveyor speed because of the dependence on Fc, as can easily be seen from a comparison of FIG. 6(b) (high conveyor speed) and FIG. 6(a) (low conveyor speed). Therefore, in order to maintain the value SHIFT constant, the value HOSEIB must change with conveyor speed as well. The manner in which HOSEIB is calculated is shown in FIG. 5; this algorithm is executed repetitively, at a rate on the order of 10 ms.

Figure 6C:
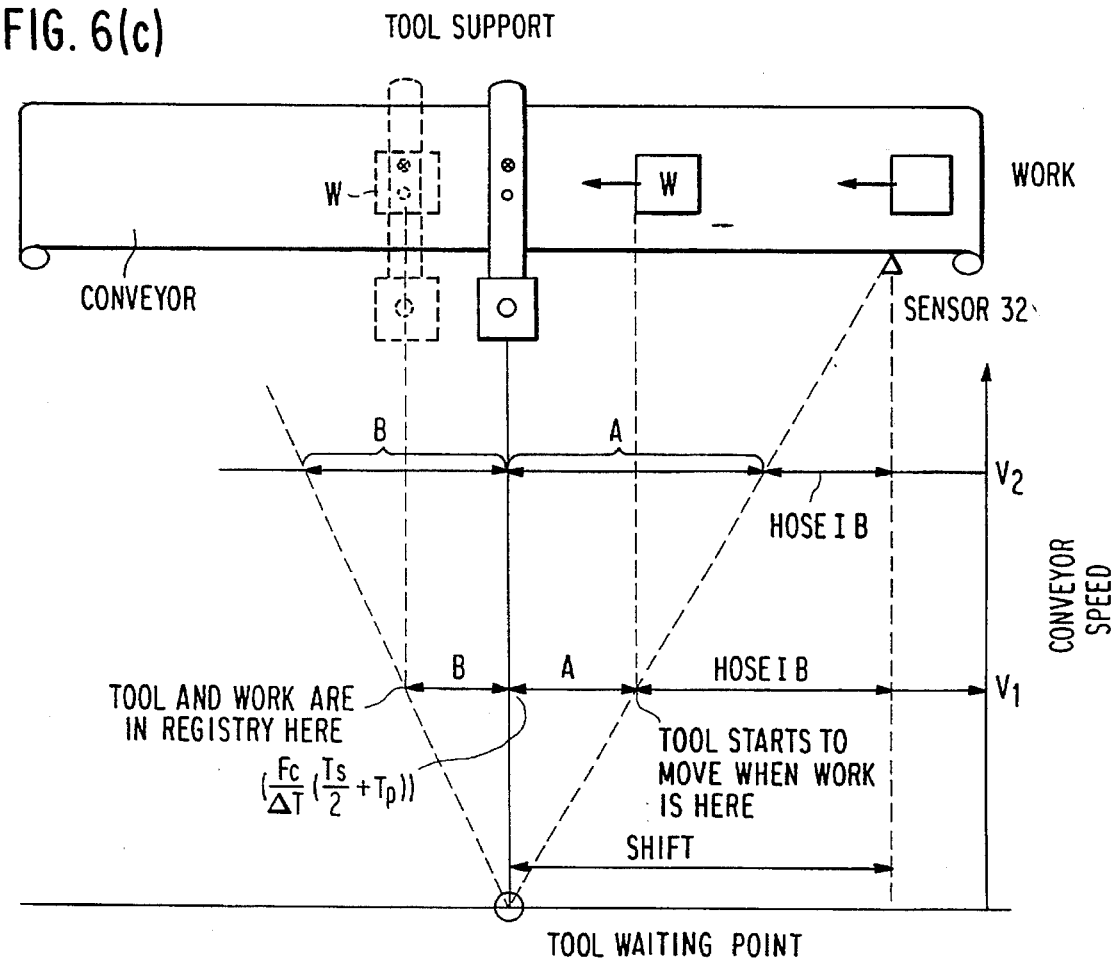
Figure 8A:
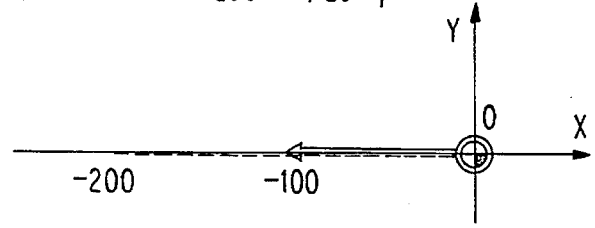
FIGS. 8(a) and 8(b) give a program example for synchronous control in the prior art.
Figure 8B:
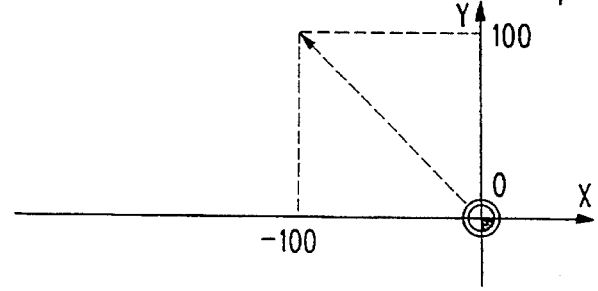
Figure 7:
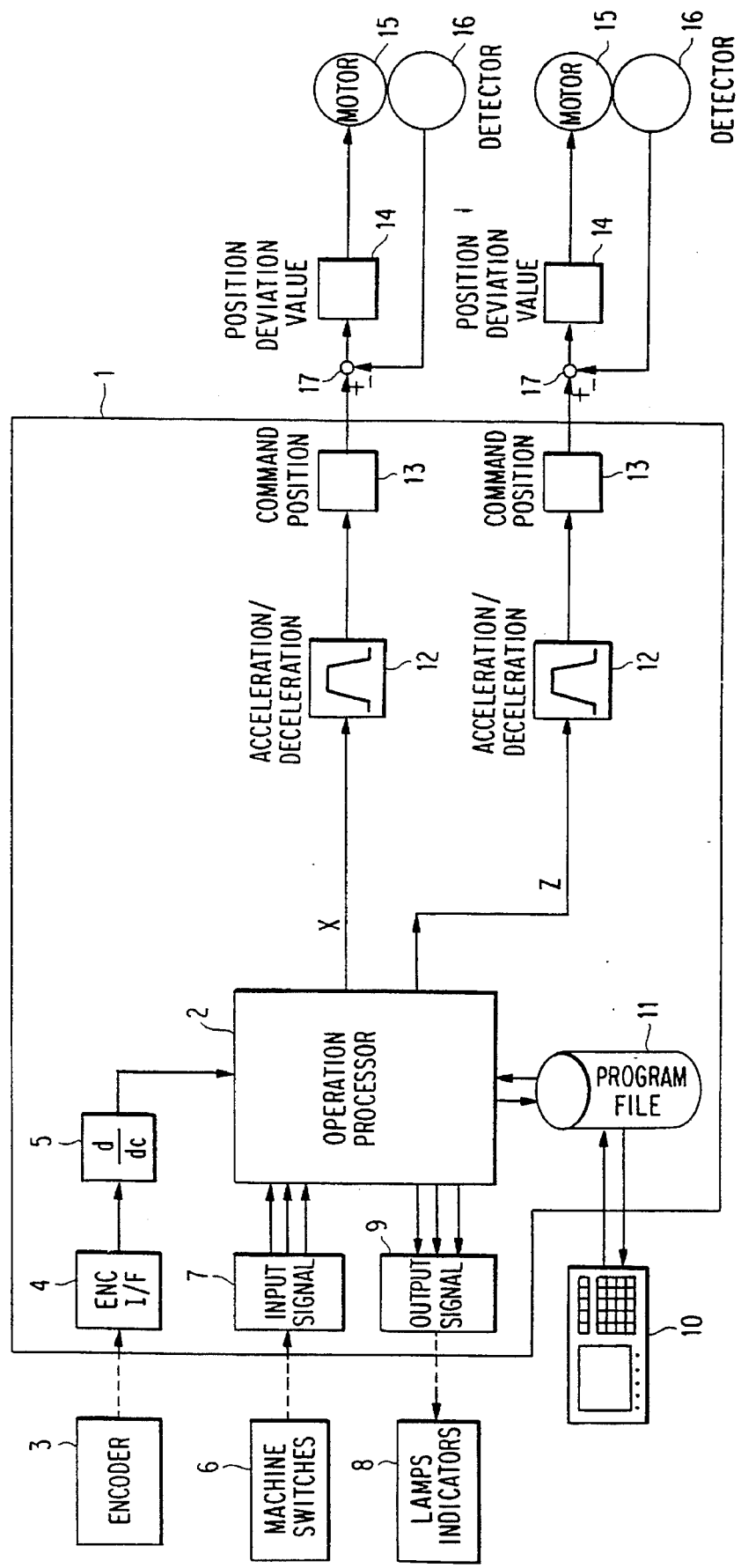
FIG. 7 is a block diagram illustrating the sequences of signals and data in the synchronous control of a motion controller known in the art.
Figure 9A:
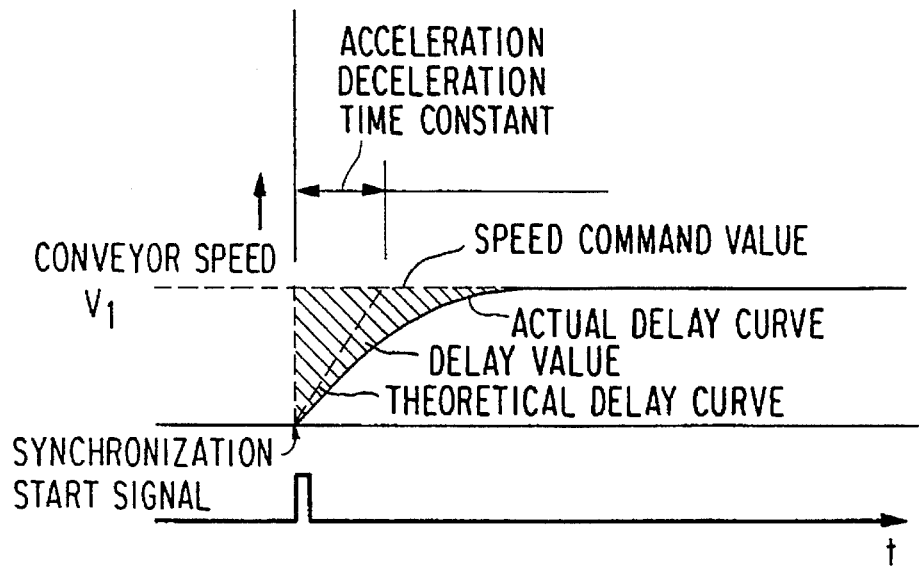
FIGS. 9(a) and 9(b) provides a relationship between conveyor speed and a machine delay value in the prior art.
Figure 9B:
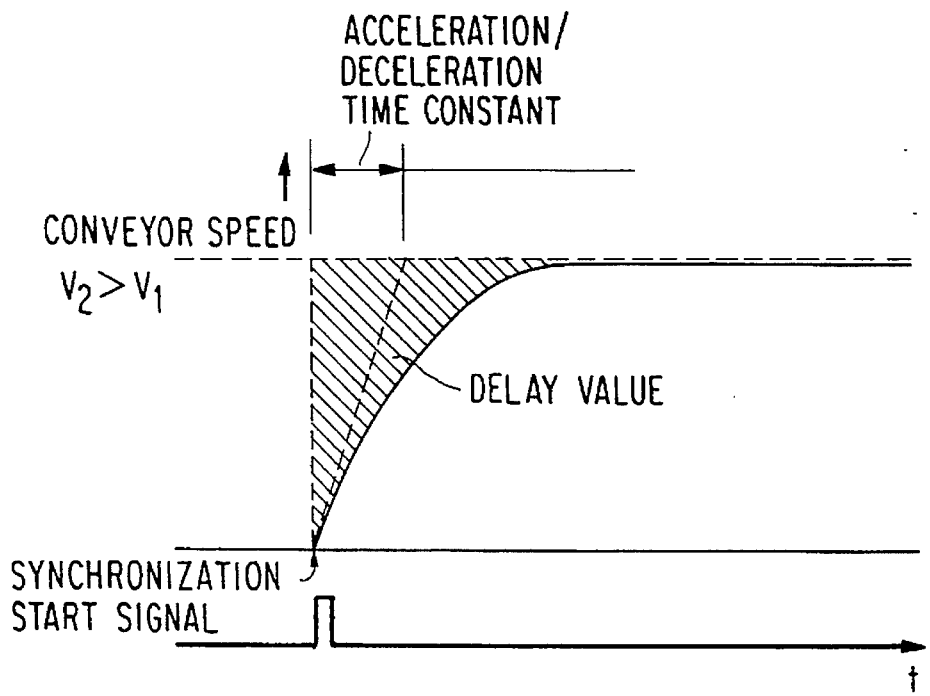
Figure 10:
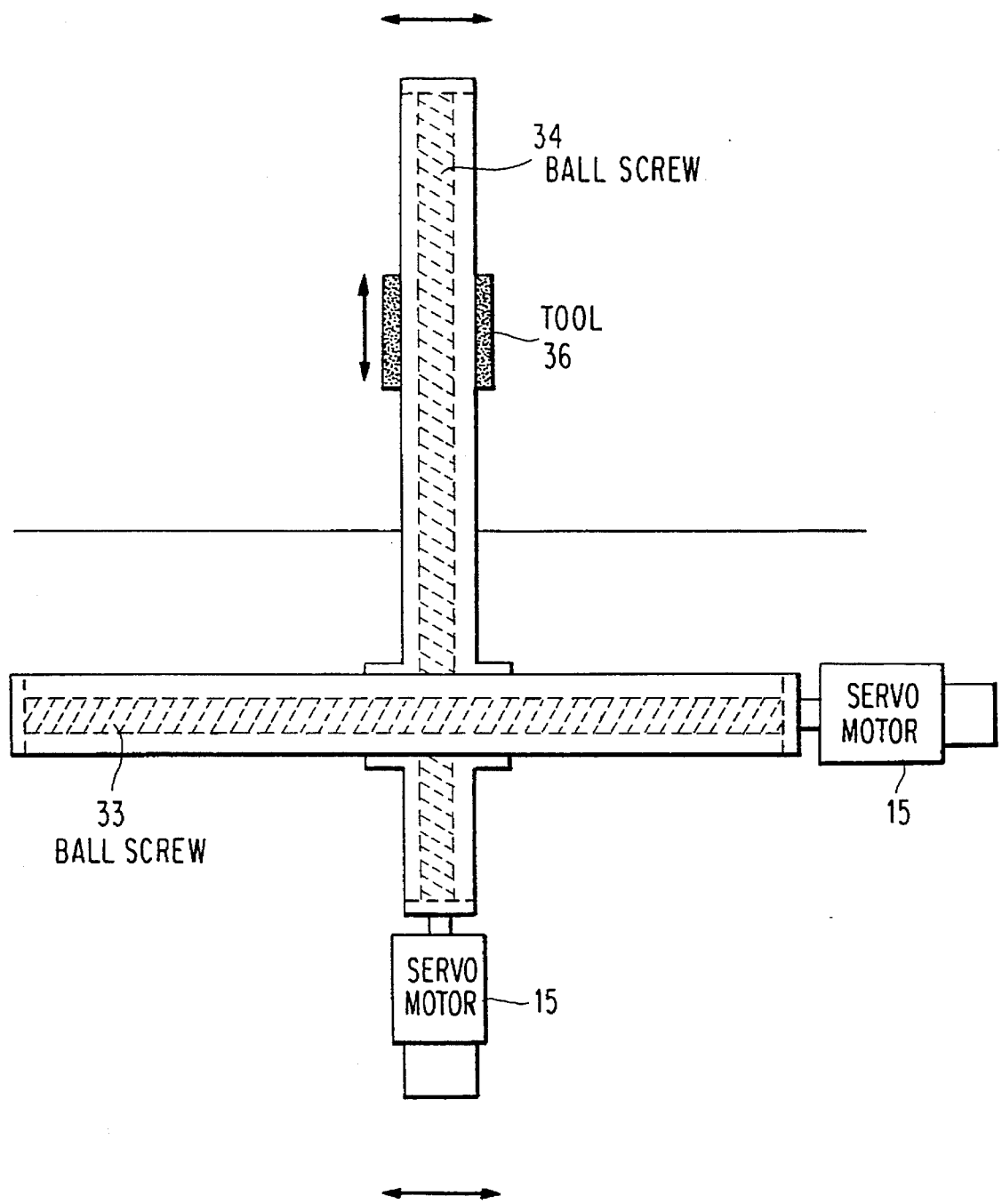
FIG. 10 is an illustration of a tool movement mechanism.

FIG. 6(c) illustrates a physical representation of SHIFT, HOSEIB, A, and B shown in FIGS. 6(a) and 6(b). As seen in FIG. 6(c), SHIFT represents the distance between the detection point of the work (sensor 32), which also represents the point at which the synchronization start signal (overlapping command) is generated, and the location of the machine tool at its waiting point. HOSEIB represents the distance between the location of sensor 32 and the location of the work when the machine tool starts to move. The value A corresponds to the distance between the location of the work when the machine tool starts to move and the initial waiting point of the tool. Finally, value B is the distance between the initial tool waiting point and the location at which workpiece and tool are in synchronization registry.

As can be seen from the diagonal dotted lines in FIG. 6(c), the values of. HOSEIB, A and B are all variable with conveyor speed; only the parameter SHIFT is a constant.

Returning to the algorithm shown in FIG. 5, the process begins at step S-50 by operator input of an initiate command. Calculation is started at step S-50(a) and the encoder pulses are calculated at step S-50(b). A determination is made in step S-51 of whether an overlapping signal command has been input; if not, both the theoretical offset (HOSEIB) and current offset (HOSEIA) values are set to zero and the overlapping value due to conveyor movement Fc' is set to zero in step S60 and this value is added to the speed command of the operation processor at node 26 or 27 with no effect. However, where there is an overlapping signal command in step S-51, the process proceeds to use the synchronizing encoder pulse value calculated in step S-50(b) and a calculation of conveyor movement speed Fc is undertaken in step S-54. On the basis of this calculated value, the theoretical offset value is determined, using equation (2), in step S-55. Then, in step S-56, a current offset value is determined, using a previously determined value and the conveyor movement value Fc. A comparison of the offset values HOSEIA and HOSEIB as made in step S-57 and if HOSEIA is not greater than HOSEIB, the process proceeds to step S-60. However, if HOSEIA is greater, the process advances to step S-58 where the overlapping movement value (Fc') for conveyor movement compensation (Fc') is calculated. HOSEIA is then set to HOSEIB, and the calculated value of Fc' is added to the speed command at step S-61. In other words, the overlapping movement value Fc' is zero until the current offset value (HOSEIA) exceeds the theoretical offset value (HOSEIB). At this point, the machine tool starts moving toward the location where it will be speed-synchronized with the conveyed workpiece, as shown in FIG. 6(c). After overlapping is begun (Fc' is non-zero), the theoretical offset value (HOSEIB) is calculated in real time in response to changes in the conveyor speed and the overlapped movement is controlled to maintain a constant set delay value (SHIFT).

When it is necessary to improve the response to conveyor speed changes, input of the overlapping speed control signals may be performed at the output of the acceleration/deceleration processor 12 as indicated by the connection of line 25 to node 27 in FIG. 1, instead of at the input to the acceleration/deceleration processor 12 as described in the first embodiment. In this case, the theoretical offset value HOSEIB in FIG. 5 is represented by the following expression:

$$HOSEIB = SHIFT - \frac{Fc}{\Delta T} Tp \qquad (3)$$

where,

HOSEIB=theoretical offset value (mm)

SHIFT=delay value set in parameter (mm)

Fc=conveyor movement per unit time ($\Delta T$)

$\Delta T$=processing period

Tp=position loop time constant (sec)

Further, while the number of overlapping axes is limited to one in the disclosed embodiment, a unit conversion processor 23 applicable to each axis may be used to allow overlapping for each axis, thereby allowing the program coordinate system to be automatically shifted in more than one axial direction.

It will be apparent, as described above, that according to the invention, speed command overlapping circuitry combines conveyor movement information output by a conveyor movement detection unit with machining information on the workpiece from the operation processor for machining the workpiece on the conveyor in synchronization with the motion of the conveyor. A position compensating means maintains a predetermined positional relationship between the machining device and the workpiece on the conveyor, independently of the magnitude of the moving speed of the conveyor. A synchronous control process for a motion controller according to the invention includes a process of combining the conveyor movement information with the workpiece machining information and machining the workpiece on the conveyor in synchronization with the motion of the conveyor, so that the workpiece on the conveyor can be machined in synchronization with the motion of the conveyor without considering the feed of the conveyor in writing a machining program run by the machining information operating means.

What is claimed is:

1. A motion controller comprising:

machining information means for running a machining program to machine a workpiece on a conveyor via machining means in accordance with an external command, operating on machining information on said workpiece, and outputting an operation result;

conveyor movement information means for operating on movement information of said conveyor in accordance with detected movement of said conveyor; and overlapping means for overlapping conveyor movement information output by said conveyor movement information means with said workpiece machining information provided by said machining information means, for machining the workpiece on said conveyor in synchronization with the motion of said conveyor.

2. A motion controller defined in claim 1, wherein the conveyor movement information means comprises position compensating means for maintaining a predetermined positional relationship between the machining means and the workpiece on said conveyor, independently of the magnitude of the moving speed of the conveyor.

3. A synchronous control process for a motion controller, comprising the steps of:

processing movement information on a conveyor using conveyor movement information entered by an encoder for detecting the movement of said conveyor;

running a machining program for a machine tool used for machining of a workpiece in accordance with an external command, and processing the machining information on said workpiece; and overlapping said processed conveyor movement information with said processed workpiece machining information using information overlapping means and machining the workpiece on said conveyor in synchronization with the motion of said conveyor.

* * * * *